US012565955B2

(12) United States Patent

Folchert

(10) Patent No.: US 12,565,955 B2

(45) Date of Patent: Mar. 3, 2026

(54) CONNECTION DEVICE FOR CONNECTING A FLUID LINE TO A CONNECTION BODY

(71) Applicant: Continental Automotive Technologies GmbH, Hannover (DE)

(72) Inventor: Uwe Folchert, Lauenau (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/770,983

(22) Filed: Jul. 12, 2024

(65) Prior Publication Data

US 2025/0020250 A1    Jan. 16, 2025

(30) Foreign Application Priority Data

Jul. 12, 2023    (DE) ..................... 10 2023 206 627.0

(51) Int. Cl.
  *F16L 37/091*    (2006.01)
  *F16L 37/088*    (2006.01)
(52) U.S. Cl.
  CPC ........... *F16L 37/091* (2013.01); *F16L 37/088* (2013.01)
(58) Field of Classification Search
  CPC ..... F16L 37/091; F16L 37/088; F16L 37/098; F16L 37/12; F16L 37/50; F16L 37/53; F16L 47/18; F16L 47/08; F16L 47/12
  See application file for complete search history.

(56) References Cited

U.S. PATENT DOCUMENTS

| | | | |
|---|---|---|---|
| 4,664,427 A * | 5/1987 | Johnston | ............. F16L 37/0927 285/902 |
| 5,609,370 A | 3/1997 | Szabo et al. | |
| 6,733,047 B1 | 5/2004 | Stieler | |

(Continued)

FOREIGN PATENT DOCUMENTS

| | | |
|---|---|---|
| CN | 111706735 A | 9/2020 |
| DE | 3923579 A1 | 1/1990 |

(Continued)

OTHER PUBLICATIONS

Office Action (Notice of Reasons for Refusal) issued Jun. 18, 2025, by the Japan Patent Office in corresponding Japanese Patent Application No. 2024-103736 and an English translation of the Office Action. (5 pages).

(Continued)

*Primary Examiner* — Aaron M Dunwoody
(74) *Attorney, Agent, or Firm* — Buchanan Ingersoll & Rooney PC

(57)    ABSTRACT

A connection device for connecting a fluid line to a connection body that includes a basic body insertable in a form-fitting manner into a connection opening in the connection body. The basic body defines a through opening, in which an end portion of the fluid line is received. A fastener arranged in the through opening, holds the fluid line within the basic body. A first spacer and a first sealing member are pushed over the end portion. A closure member, with a plug-in opening for the fluid line, is mounted onto a closure portion of the basic body. As a result, the fastener, the first spacer and the first sealing member are held within the through opening. A second spacer, arranged between the first sealing member and the closure member, is pushed over the end portion of the fluid line.

10 Claims, 2 Drawing Sheets

(56)        References Cited

U.S. PATENT DOCUMENTS

| | | |
|---|---|---|
| 2007/0108764 A1 | 5/2007 | Nicolino |
| 2016/0025252 A1 | 1/2016 | Tran et al. |

FOREIGN PATENT DOCUMENTS

| | | |
|---|---|---|
| DE | 102016101533 A1 | 8/2017 |
| DE | 102022200329 A1 | 7/2023 |
| EP | 0610538 A1 | 8/1994 |
| EP | 2366934 A1 | 9/2011 |
| JP | H01-255790 A | 10/1989 |
| JP | H10-509501 A | 9/1998 |
| JP | 2001-108175 A | 4/2001 |
| JP | 2016-020743 A | 2/2016 |
| JP | 2021-055759 A | 4/2021 |
| JP | 2022-029434 A | 2/2022 |
| WO | 2017129667 A1 | 8/2017 |

OTHER PUBLICATIONS

Office Action issued Mar. 27, 2024, by the German Patent and Trademark Office in corresponding German Patent Application No. 10 2023 206 627.0 and an English translation of the Office Action. (8 pages).

* cited by examiner

CONNECTION DEVICE FOR CONNECTING A FLUID LINE TO A CONNECTION BODY

TECHNICAL FIELD

The embodiments relate to a connection device for connecting a fluid line to a connection body.

BACKGROUND

A multiplicity of embodiments of a connection device for a fluid line, which is to be connected to a connection body, are known. The connection device is inserted into the connection body and then an end portion of the fluid line is introduced into the connection device. As a rule, the end portion of the fluid line then engages in a fastener and is thus secured on the connection body.

WO 2017/129667 A1 describes a connection device for the plug-in connection of a fluid line, wherein the connection device comprises a basic body with a closure member. On a front region in the installation direction, the basic body has a screw shaft with an external threaded portion, by means of which it is screwed into a threaded bore in a connection body. Counter to the installation direction, the external threaded portion is adjoined by a sealing portion in the basic body, the sealing portion having a circumferentially running groove in which an annular sealing member is arranged, as a result of which the basic body is sealed in relation to the connection body by the sealing member. The basic body furthermore comprises an inner through opening running in the axial direction with a contact shoulder, on which a fastening member, followed by a spacer and a sealing member are arranged in the installation direction. In this case, the spacer is arranged between the fastener and the sealing member. The sealing member, the spacer and the fastener are held in the through opening in the basic body in the installation direction by an inwardly directed contact shoulder, as a result of which an axial displacement in the direction of the connection body is prevented. After the fastener, spacer and sealing member are inserted into the through opening in the basic body, a closure member is inserted into the rear end of the basic body, as seen in the installation direction. The closure member has, in the axial direction, a plug-in opening for the fluid line to be inserted, wherein an inner groove is formed, and a sealing member is arranged, in the plug-in opening in the closure member. In the inserted state, the closure member lies in the installation direction with its inwardly directed end face on a step surface in the through opening and on the sealing member mounted in the through opening, thus preventing the inserted sealing member, spacer and fastener from being pulled with the fluid line out of the through opening in the basic body counter to the installation direction when pressure is applied. The closure member is fixed, for example, by bending over at the rear end of the basic body in the installation direction. Alternatively, however, fixing can also be carried out by pressing or latching the closure member into place.

In the case of such a connection device from the prior art, it has turned out that the closure member and the basic body are permanently connected. In order for the closure member to be able to be released from the basic body, the closure member and/or the basic body, in which the closure member is mounted, has to be destroyed.

When a defective connection device is replaced, the plugged-in fluid line with the fastener, spacer and sealing member pushed onto it cannot be easily pulled out of the basic body, since the basic body is closed by a permanent closure member. The defective connection device can be replaced only by cutting off the fluid line.

Due to the non-releasable connection between the closure member and the basic body, the fluid line has to be cut off outside the connection device, which the fluid line, after being cut off, may no longer have the required minimum length and thus can no longer be connected to a new connection device and to the connection body. The fluid line therefore also has to be replaced so that it has the required minimum length for the connection.

Due to the non-releasable connection between the closure member and the basic body, the sealing member, spacer and fastener inserted into the basic body cannot be removed and reused in the event of the defective connection device being replaced. The sealing member, spacer and fastener inserted into the basic body are thus lost when a defective connection device is replaced.

In order for the sealing member, spacer and fastener inserted into the basic body to optionally be reused after a replacement, the defective connection device has to be destroyed so that the sealing member, spacer and fastener inserted into the basic body can be removed. This may result in damage to the sealing member inserted into the basic body, since the sealing member lies flat on the inside of the non-releasable closure member in the basic body.

SUMMARY

The present embodiments are based on the object of providing a releasable connection device for connecting a fluid line to a connection body.

The connection device is used, for example, in a connection body of a motor vehicle, for example with as a pressure medium supply device or valve block, so that the pressure medium supply device can be connected to other components of the vehicle via a fluid line, e.g. as a pressure medium line.

BRIEF DESCRIPTION OF THE DRAWINGS

Further embodiments emerge from the following description of exemplary embodiments on the basis of the figures, in which.

DETAILED DESCRIPTION

Figure 1:
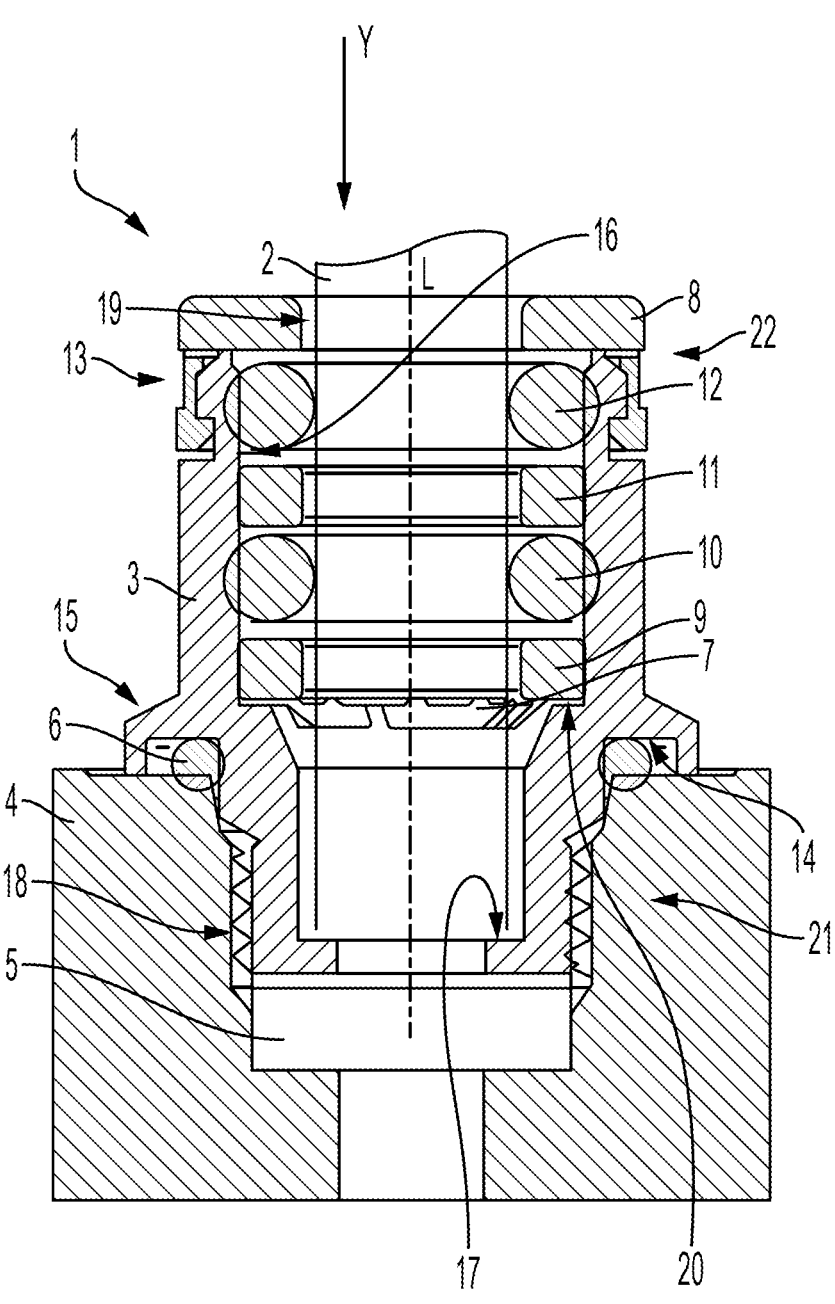
FIG. 1 shows an exemplary connection device.

FIG. 1 shows, in a sectional illustration, an exemplary connection device 1 comprising a basic body 3 in the form of a hollow cylinder with a through opening 16 for receiving an end portion of a fluid line 2, wherein the basic body 3 is received in a connection opening 5 in a connection body 4. The connection body 4 may be, for example, a pressure medium supply device or a valve block of a vehicle.

As an example, the basic body 3 is screwed into the connection opening 5 by means of a thread. For this purpose, the basic body 3 comprises an external thread on a joining portion 21 and the connection opening 5 is correspondingly provided with an internal thread. This means that the basic body 3 is fixedly connected to the connection opening 5 in the connection body 4. Other force-fitting and/or form-fitting ways of connecting the basic body 3 and the connection body 4 are also possible. For example, the basic body 3 can be pressed into the connection opening 5 in the connection body 4.

By means of the connection device 1, the end portion of the fluid line 2 is to be fixedly connected to the connection body 4, so that a pressure medium can be conducted through the fluid line 2 either to or from the connection body 4.

To connect the fluid line 2 to the connection body 4, the end portion of the fluid line 2 is inserted through a plug-in opening 19 in a closure member 8 along a longitudinal axis L of the connection device 1 into the through opening 16 of the basic body 3. A fastener 7 which is designed to receive the end portion of the fluid line 2 and to hold same in the connection device 1 is arranged in the basic body 3. The fastener 7 can be, for example, a serrated lock washer or a lock washer. The fastener 7 is mounted axially displaceably and rotatably in the through opening 16 in the basic body 3. The loose receiving of the fastener 7 in the basic body 3 brings about a free movement along the longitudinal axis L and a free rotational movement of the received end portion of the fluid line 2 in the basic body 3 about this axis. As a result, the fluid line 2 connected to the connection device 1 can be installed and removed and can be held and displaced in various holding positions. When the end portion of the fluid line 2 is inserted through into the fastener 7, radially inwardly directed tabs of the fastener 7 are bent from the end portion. The tabs interlocking in the process on the outer wall of the fluid line 2 act on the fluid line 2 as barbs with a certain counterforce. The end portion of the fluid line 2 is thus held in the basic body 3 and secured against being pulled out or pushed out. The fastener 7 rests with its outer ring on a contact shoulder 20 of the basic body 3. The contact shoulder 20 is formed in the through opening 16 in the basic body 3 and protrudes radially inward. From here, the diameter of the passage opening 16 is also tapered in the direction of the connection opening 5.

In order that the end portion of the fluid line 2 upon being introduced is not pushed too deep into the connection body 4, an annular end stop 17 is also formed in the basic body 3. The end stop 17 is formed as a radially inwardly directed collar at the lower edge of the joining portion 21 of the basic body 3. The end of the fluid line 2 butts against said collar and cannot continue. At the same time, the end stop 17 forms the outlet opening of the connection device 1.

The closure member 8 is placed onto the exposed portion of the basic body 3, which serves as a closure portion 22, in the installation direction Y on the basic body 3. The closure member 8 comprises a securing member 13 by means of which the closure member 8 is fixedly, but releasably connected to the basic body 3. The non-destructive fastening of the closure member 8 to the basic body 3 and the various types of connection is described in more detail in the description of FIGS. 2a to d. The plug-in opening 19 of the closure member 8 has a smaller diameter than the through opening 16 in the basic body 3. The closure member 8 thus at least partially covers the through opening 16 from above.

In addition to fastening member 7, further members are arranged in the interior of the through opening 16, which contribute to the fastening and sealing of the fluid line 2 in the connection device 1. As seen counter to the installation direction Y, the fastener 7 is followed by a first spacer 9, which rests on the fastener 7. This is followed at a slightly spatial distance by a first sealing member 10. Slightly spatially spaced from this is a second spacer 11 and also slightly spatially spaced from the latter is a second sealing member 12. This arrangement of the closure member 8, which holds the fastener 7, first spacer 9, first sealing member 10, second spacer 11 and second sealing member 12 in the through opening 16 in the basic body 3, is completed. Consequently, the first spacer 9, a first sealing member 10, a second spacer 11 and a second sealing member 12 are plugged over the end portion of the fluid line 2.

The fastener 7 is designed to transmit tensile and/or compressive forces acting on the fluid line 2 via the first spacer 9 to the first sealing member 10 and further via the second spacer 11 and the second sealing member 12 to the closure member 8. The fastener 7, first spacer 9, first sealing member 10, second spacer 11 and second sealing member 12 are mounted movably in the longitudinal direction within the through opening 16 in the basic body 3 so that, when tensile and/or compressive forces act on the fluid line 2, an increased compression of the sealing member 10 and 12 is achieved and thus a greater sealing effect against internal and external influences is produced.

The second spacer 11 assists in the first sealing member 10 having a proper seat and fulfils its proper function in the basic body 3. The second spacer 11 assists in the fastener 7, first spacer 9 and first sealing member 10 aligning flat with respect to each other after installation in the through opening 16 before the closure member 8 is mounted onto the basic body 3. The second spacer 11 also assists in the fluid line 2 is guided more easily during the installation and removal in the through opening 16 of the basic body 3 and is thus better aligned. As a result, the fastener 7 is pushed vertically into the through opening 16 so that it cannot become wedged and damaged.

Furthermore, by means of the second spacer 11, during the removal, the fluid line 2 together with the second sealing member 12 can be removed from a defective connection device 1 and, when subsequently installed into a new connection device 1, is better introduced and protected against damage.

The second sealing member 12 seals the fluid line 2 in the region of the plug-in opening 19 in the closure member 8. This means that a closure member on a sealing member can be dispensed with. The second sealing member 12 is used to protect against environmental influences such as water, dirt or other media. The connection device 1 is thus sealed against influences from the outside, which could act on the fluid line 2 received therein.

For example, when the connection device 1 is used in a vehicle, the fluid line 2 is exposed to tensile and/or compressive forces. Elastic sealing member 10 and 12 achieve a compression which readily seals the fluid line 2 in an airtight manner and outwardly protects same against environmental influences.

The closure member 8 with its small plug-in opening 19 in relation to the diameter of the through opening 16 is designed to absorb tensile and/or compressive forces acting on the fluid line 2, said forces being transmitted to said closure member via the fastener 7, first spacer 9, first sealing member 10, second spacer 11 and second sealing member 12.

The basic body 3 is, for example, made of a corrosion-resistant plastics material so that corrosion between the connection body 4 and the basic body 3 is prevented. For example, polyolefins, polyvinyl chlorides or fluoropolymers are used as the plastic. These plastics materials are, for example, less expensive than brass and are simpler in the production and processing of a connection device 1. In addition, these plastics materials have a galvanic corrosion resistance of the connection device 1 in relation to the connection body 4 under acting environmental influences, such as salt and water, for example.

The basic body 3 furthermore comprises, at its outer circumference, at the transition from the joining portion 21 in the direction of the closure portion 22, a flange 15 with a groove 14 which runs circumferentially and in which a basic body sealing member 6 is used, as a result of which the basic body 3 is sealed in relation to the connection body 4. This prevents fluid from escaping from the connection body 4 along the connection with the basic body 3.

In the FIGS. 2a to d below, the different types of fastening of the closure member 8 with the basic body 3 are presented.

Figures 2A, 2B:
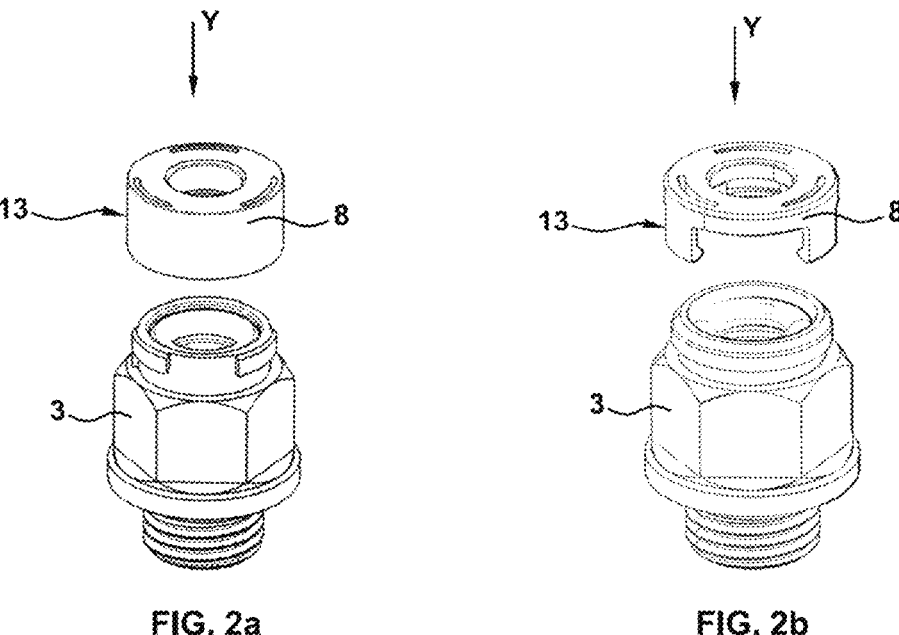
FIGS. 2a to d show a closure member with differently designed securing means.

FIG. 2a shows a first exemplary connection of the closure member 8 to the basic body 3. The connection of the closure member 8 to the basic body 3 is designed in the form of a bayonet closure. The securing member 13 of the closure member 8 comprises the inner bayonet grooves, which interact with bayonet cams formed in the region of the closure portion of the basic body 3. The closure member 8 is placed onto the basic body 3 in the installation direction Y. The cams engage in the grooves by rotating the closure member 8 and the basic body 3 in opposite directions. The closure member 8 is thereby releasably but fixedly connected to the basic body 3 in the axial direction. The connection is reopened by simply rotating the closure member 8.

FIG. 2b shows a second exemplary connection of the closure member 8 to the basic body 3. The closure member 8 comprises a multiplicity of snap hooks as securing member 13. These snap hooks extend in the installation direction Y. As a counterpart, a circumferentially running groove in which the snap hooks engage is provided in the closure portion of the basic body 3. In this type of connection, the closure member 8 are simply plugged axially onto the basic body 3 until the snap hooks latch in the groove. By radially expanding the snap hooks, the closure member 8 can be released from the basic body 3.

Figures 2C, 2D:
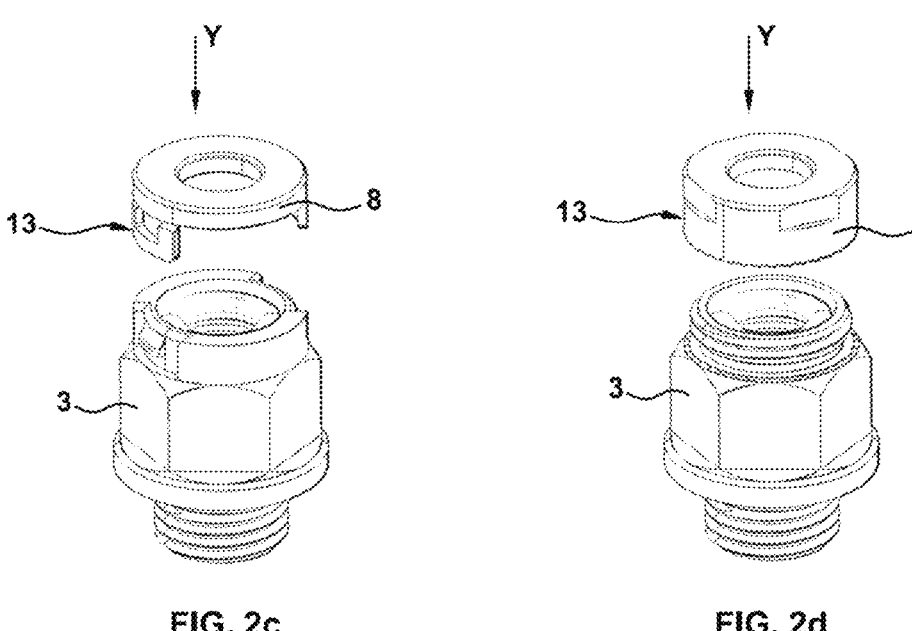

FIG. 2c shows a third exemplary type of connection of the closure member 8 to the basic body 3, which is based on the same operating principle as the exemplary embodiment of FIG. 2b. In this case, the securing member 13 of the closure member 8 are provided with a recess which is designed to receive respective hooks which are formed on the basic body 3.

Finally, the FIG. 2d shows a fourth exemplary type of connection of the closure member 8 to the basic body 3. In this case, the securing member 13 is designed as an internal thread in the interior of the closure member 8, which is designed to interact with an external thread, which is formed in the region of the closure portion on the basic body 3. This means that the closure member 8 is supplied to the basic body 3 in the installation direction Y and then twisted until the pair of threads reaches the stop. In addition, protection against release is provided by a toothing which runs circumferentially at the lower edge of the closure member 8 and, during the tightening, engages in the corresponding counterpart on the basic body 3. In this case, the securing teeth of the closure member 8 interlock with those of the basic body 3 and secure the connection against twisting and release.

The non-destructive removal of the closure member 8 according to FIGS. 2a to d provides that, after the closure member 8 have been pulled off from the basic body 3, the fluid line with the fastener, spacer and sealing member pushed onto it can be pulled out of the basic body 3. This does not require the fluid line to be cut off to replace a defective connection device.

Further, after the fluid line has been pulled out, the fastener are removed by being destroyed. This means that the sealing member pushed onto the fluid line and the spacer can be pulled off and reused. Therefore, when a defective connection device is replaced, the fluid line does not have to be cut off and can therefore be used for connection to a new connection device.

The invention claimed is:

1. A connection device comprising:
   a fluid line;
   a connection body defining a connection opening:
   a basic body insertable with a joining portion in a form-fitting manner into the connection opening, wherein the basic body defines a through opening in a longitudinal direction, in which an end portion of the fluid line is received;
   a fastener to hold the fluid line within the basic body is arranged in the through opening;
   a first spacer and a first sealing member, the first sealing member being spatially spaced from the first spacer and the fastener in the longitudinal direction, and wherein the first spacer and the first sealing member are pushed over the end portion of the fluid line;
   a closure member defining a plug-in opening for the fluid line is mounted onto a closure portion of the basic body facing away from the connection body, such that the fastener, the first spacer and the first sealing member are held within the through opening in the basic body;
   a second spacer and second sealing member, which are arranged in the through opening in the basic body, the second sealing member being spatially spaced from the second spacer and the closure member in the longitudinal direction, and wherein the second spacer and the second sealing member are pushed over the end portion of the fluid line;
   the first sealing member is spatially spaced from the first spacer and the second spacer in the longitudinal direction; and
   wherein the first spacer, the first sealing member, the second spacer, and the second sealing member are movable with respect to one another in the longitudinal direction under at least one of a tensile and compression loading of the fluid line.

2. The connection device as claimed in claim 1, wherein the first spacer and the second spacer are not elastically deformable.

3. The connection device as claimed in claim 1, wherein the plug-in opening in the closure member is smaller in diameter than the through opening in the basic body.

4. The connection device as claimed in claim 1, wherein the closure member comprises at least one securing member, via which the closure member is releasably and non-destructively connected to the basic body.

5. The connection device as claimed in claim 4, wherein the securing member has a plurality of bayonet cams, which engage in corresponding bayonet grooves defined on the closure portion of the basic body.

6. The connection device as claimed in claim 4, wherein the securing member comprises a plurality of snap-action hooks, which engage in a corresponding groove formed in a circumferential direction on the closure portion of the basic body.

7. The connection device as claimed in claim 4, further comprising a plurality of hooks on the closure section of the basic body and a plurality of tabs on the securing member each defining an inner recess, wherein the plurality of hooks are received within the inner recess of the plurality of tabs.

8. The connection device as claimed in claim 4, wherein the securing member is in an internal thread to be rotated onto an external thread formed on the closure portion of the basic body.

9. The connection device as claimed in claim 8, wherein the closure member comprises a circumferentially running toothing to interact with a corresponding toothing on the closure portion of the basic body.

10. The connection device as claimed in claim 1, wherein, when under the at least one of the tensile and compression loading of the fluid line, the fastener is configured to transmit tensile and/or compressive forces acting on the fluid line via the first spacer to the first sealing member and further via the second spacer and the second sealing member to the closure member.

* * * * *